(12) United States Patent
Tenghamn

(10) Patent No.: US 9,322,945 B2
(45) Date of Patent: Apr. 26, 2016

(54) SYSTEM AND METHOD FOR SEISMIC SURVEYING USING DISTRIBUTED SOURCES

(71) Applicant: PGS Geophysical AS, Lysaker (NO)

(72) Inventor: Stig Rune Lennart Tenghamn, Katy, TX (US)

(73) Assignee: PGS Geophysical AS, Oslo (NO)

( * ) Notice: Subject to any disclaimer, the term of this patent is extended or adjusted under 35 U.S.C. 154(b) by 515 days.

(21) Appl. No.: 13/787,520

(22) Filed: Mar. 6, 2013

(65) Prior Publication Data

US 2014/0254316 A1   Sep. 11, 2014

(51) Int. Cl.
*G01V 1/38*   (2006.01)
*G01V 1/02*   (2006.01)

(52) U.S. Cl.
CPC . *G01V 1/38* (2013.01); *G01V 1/159* (2013.01); *G01V 1/3808* (2013.01); *G01V 1/3817* (2013.01); *G01V 2210/1214* (2013.01); *G01V 2210/1293* (2013.01)

(58) Field of Classification Search
CPC ....... G01V 1/38; G01V 1/159; G01V 1/3808; G01V 1/3817; G01V 2210/1214; G01V 2210/1293
USPC .......................................................... 367/20
See application file for complete search history.

(56) References Cited

U.S. PATENT DOCUMENTS

| | | | |
|---|---|---|---|
| 1,097,859 A | 5/1914 | Hecht | |
| 1,155,124 A | 9/1915 | Berger | |
| 2,832,952 A | 4/1958 | Bango | |
| 4,014,403 A | 3/1977 | Mifsud | |
| 4,384,351 A | 5/1983 | Pagliarini et al. | |
| 4,483,411 A | 11/1984 | Mifsud | |
| 4,557,348 A | 12/1985 | Mifsud | |
| 4,578,784 A | 3/1986 | Mifsud | |
| 4,633,970 A | 1/1987 | Mifsud | |
| 4,862,429 A | 8/1989 | Rolt | |
| 5,126,979 A | 6/1992 | Rowe et al. | |
| 5,375,101 A | 12/1994 | Wolfe et al. | |
| 5,652,735 A | 7/1997 | Johansen et al. | |
| 5,995,452 A | 11/1999 | Bouyoucus | |
| 6,556,510 B2 | 4/2003 | Ambs | |
| 6,590,832 B2 | 7/2003 | Dubois et al. | |

(Continued)

FOREIGN PATENT DOCUMENTS

| EP | 0835462 | 1/2003 |
|---|---|---|
| GB | 2263842 | 8/1993 |

(Continued)

OTHER PUBLICATIONS

"Multi-Azimuth Seismic", Tech Link vol. 5 No. 3, p. 1-4 dated Jul. 2005.

(Continued)

*Primary Examiner* — Daniel L Murphy

(57) ABSTRACT

Disclosed are methods and systems for marine surveying that use electrically powered seismic sources that are distributed at spaced apart locations. In one example, a marine seismic survey system comprises: a survey vessel; a plurality of seismic sources configured to be towed by the survey vessel, wherein the seismic sources are electrically powered and are distributed behind the survey vessel at spaced apart locations with a spacing of about 50 meters or more; and a plurality of sensor streamers configured to be towed.

26 Claims, 6 Drawing Sheets

(56) References Cited

U.S. PATENT DOCUMENTS

| | | |
|---|---|---|
| 6,606,958 B1 | 8/2003 | Bouyoucos |
| 6,771,565 B2 | 8/2004 | Jopling et al. |
| 6,901,028 B2 | 5/2005 | Clayton et al. |
| 7,142,481 B1 | 11/2006 | Metzbower |
| 7,539,079 B2 | 5/2009 | Hoogeveen et al. |
| 7,551,518 B1 | 6/2009 | Tenghamn |
| 7,737,698 B2 | 6/2010 | Tenghamn |
| 7,804,738 B2 | 9/2010 | Storteig et al. |
| 7,881,158 B2 | 2/2011 | Tenghamn |
| 7,929,380 B2 | 4/2011 | Wei et al. |
| 7,957,220 B2 | 6/2011 | Howlid et al. |
| 7,974,152 B2 | 7/2011 | Tenghamn |
| 8,050,139 B2 | 11/2011 | Berstad |
| 8,050,867 B2 | 11/2011 | Johnson et al. |
| 8,061,471 B2 | 11/2011 | Wei |
| 8,079,440 B2 | 12/2011 | Laycock |
| 8,081,540 B2 | 12/2011 | Ross |
| 8,094,514 B2 | 1/2012 | Tenghamn |
| 8,098,542 B2 | 1/2012 | Hillesund et al. |
| 8,102,731 B2 | 1/2012 | Cambois |
| 8,154,176 B2 | 4/2012 | Karakaya et al. |
| 8,167,082 B2 | 5/2012 | Eick et al. |
| 8,174,927 B2 | 5/2012 | Hopperstad et al. |
| 8,189,426 B2 | 5/2012 | West et al. |
| 8,205,711 B2 | 6/2012 | Hopperstad et al. |
| 8,261,875 B2 | 9/2012 | Eick et al. |
| 8,331,198 B2 | 12/2012 | Morozov et al. |
| 8,335,127 B2 | 12/2012 | Tenghamn |
| 8,342,288 B2 | 1/2013 | Eick et al. |
| 8,441,892 B2 | 5/2013 | Morozov et al. |
| 8,634,276 B2 | 1/2014 | Morozov et al. |
| 8,851,170 B2 * | 10/2014 | Ayodele et al. ............ 166/272.3 |
| 2007/0165486 A1 | 7/2007 | Moldoveanu et al. |
| 2009/0010103 A1 | 1/2009 | Sallas et al. |
| 2009/0147626 A1 | 6/2009 | Vahida et al. |
| 2010/0118646 A1 * | 5/2010 | Tenghamn ..................... 367/21 |
| 2010/0226204 A1 | 9/2010 | Gagliardi et al. |
| 2011/0069741 A1 | 3/2011 | Erickson |
| 2011/0075520 A1 | 3/2011 | Gulgne et al. |
| 2011/0085422 A1 | 4/2011 | Thompson et al. |
| 2011/0090759 A1 | 4/2011 | Laycock |
| 2011/0297476 A1 | 12/2011 | Harper et al. |
| 2011/0317515 A1 | 12/2011 | Tenghamn |
| 2012/0048641 A1 | 3/2012 | Eick et al. |
| 2012/0075955 A1 | 3/2012 | Dean |
| 2012/0081997 A1 | 4/2012 | Babour et al. |
| 2012/0113747 A1 | 5/2012 | Ferber |
| 2012/0147699 A1 | 6/2012 | Dellinger et al. |
| 2012/0147709 A1 | 6/2012 | Zowarka et al. |
| 2012/0188845 A1 | 7/2012 | Jeffryes |
| 2012/0232780 A1 | 9/2012 | Delson et al. |
| 2012/0257474 A1 | 10/2012 | Cambois et al. |
| 2012/0314536 A1 | 12/2012 | Bagaini |
| 2013/0037342 A1 | 2/2013 | Engdahl |

FOREIGN PATENT DOCUMENTS

| | | |
|---|---|---|
| RU | 2398247 C1 | 8/2010 |
| WO | 94/22036 | 9/1994 |
| WO | 95/30912 | 11/1995 |
| WO | 97/01770 | 1/1997 |
| WO | WO 2013076572 A2 * | 5/2013 |

OTHER PUBLICATIONS

Rune Tenghamn, PGS Electrical Marine Vibrator, Tech Link, Nov. 2005, pp. 1-4, vol. 5, No. 11, Publication of PGS Geophysical.

Eurasian Notification of a publishing date of Patent Search Report and of Filing a Request for Substantive Examination from the Eurasian Patent Office mailed on Sep. 1, 2014, in Application No. 201490347/26 and its English translation thereof, 4 pages.

Extended European Search Report on European Patent Application No. 14155875.9 mailed Apr. 11, 2014, 15 pages.

Gijs J.O. Vermeer: "3D Symmetric Sampling of Sparse Acquisition Geometries". Geophysics, vol. 75. No. 6, Nov.-Dec. 2010, pp. 1-12.

Partial European Search Report on European Patent Application No. 14155875.9 mailed Jul. 17, 2014, 8 pages.

Nick Moldoveanu et al.: "Multivessel Coil Shooting Acquisition With Simultaneous Sources", SEG Las Vegas 2012 Annual Meeting, pp. 1-6.

Partial Machine Translation from Russian to English of Patent with publication No. RU2398247. Publication Date: Aug. 27, 2010, 4 pages.

* cited by examiner

SYSTEM AND METHOD FOR SEISMIC SURVEYING USING DISTRIBUTED SOURCES

BACKGROUND

The present invention relates generally to the field of marine seismic surveying. More particularly, in one or more embodiments, this invention relates to methods and systems that include using electrically powered seismic sources that are distributed at spaced apart locations.

Techniques for marine surveying include marine seismic surveying, in which geophysical data may be collected from below the Earth's surface. Seismic surveying has applications in mineral and energy exploration and production to help identify locations of hydrocarbon-bearing formations. Marine seismic surveying is typically performed using one or more "streamers" towed below or near the surface of a body of water. The streamers are typically cables that include a plurality of sensors disposed thereon at spaced apart locations along the length of the cable. The sensors may be configured to generate a signal that is related to a parameter being measured by the sensor. A seismic source may also be towed through the water by the same or a different vessel. At selected times, the seismic source may be actuated to generate, for example, seismic energy that travels downwardly through the water and into the subsurface rock. Seismic energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

Most of the seismic sources employed today in marine seismic surveying are of the impulsive type, in which efforts are made to generate as much energy as possible during as short a time span as possible. The most commonly used of these impulsive sources are air guns that typically utilize compressed air to generate a sound wave. Other examples of impulse-type sources include explosives and weight-drop impulse sources. Another type of seismic source that can be used in seismic surveying includes vibrator sources, including hydraulically powered sources, electro-mechanical vibrators, electrical marine vibrators, and sources employing piezoelectric or magnetostrictive material. Vibrator sources typically generate vibrations through a range of frequencies in a pattern known as a "sweep" or "chirp."

While air guns are the most commonly employed sources in seismic surveying today, there are several limitations with these types of sources. Air guns are typically supplied with air from compressors on the vessel through a line, commonly referred to as an "umbilical." Due to pressure losses in the umbilicals, there is a limit to the practical length at which the air guns can be deployed from the vessel, normally about 300 meters. Moreover, the size of the umbilicals (normally about 60-70 mm in diameter and about 300 meters in length) needed for conveying sufficient air to the guns also limits the lateral offset that can be used for the air guns due to drag on the umbilicals. Thus, there is a need for improved seismic surveys using other types of seismic sources without the limitations of air guns.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine seismic surveying. More particularly, in one or more embodiments, this invention relates to methods and systems that include using electrically powered seismic sources that are distributed at spaced apart locations.

Figure 1:
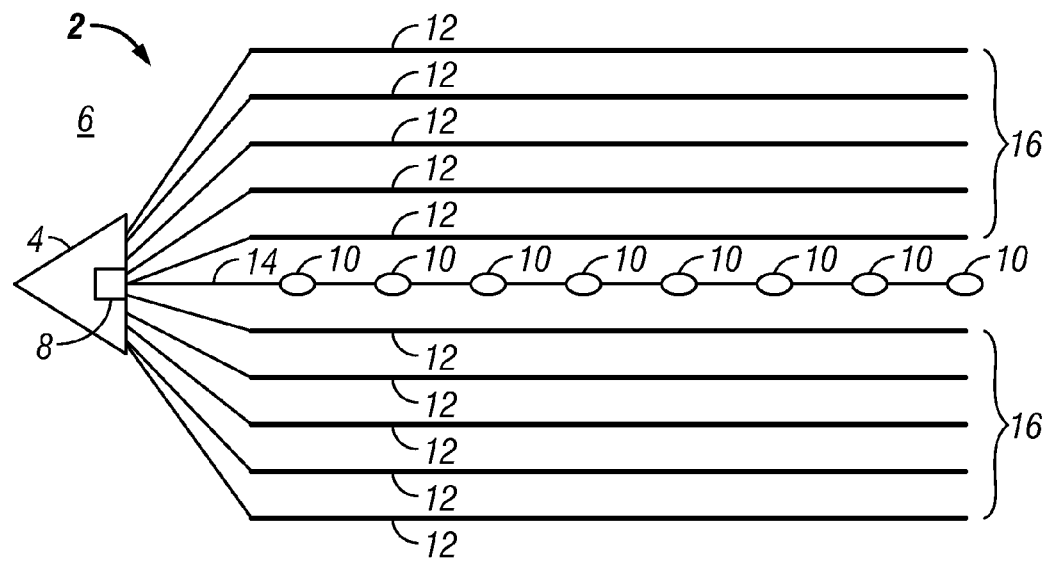
FIG. 1 illustrates an example of a marine seismic survey using electrically powered seismic sources that are distributed at spaced apart locations.

FIG. 1 illustrates a marine seismic survey system 2 in accordance with one embodiment of the present invention. In the illustrated embodiment, the system 2 may include a survey vessel 4 that moves along the surface of a body of water 6, such as a lake or ocean. The survey vessel 4 may include thereon equipment, shown generally at 8 and collectively referred to herein as a "recording system." The recording system 8 may include devices (none shown separately) for detecting and making a time indexed record of signals generated by each of seismic sensors (explained further below) and for actuating electrically powered seismic sources 10 at selected times. The recording system 8 may also include devices (none shown separately) for determining the geodetic position of the survey vessel 4 and the various seismic sensors.

As illustrated, the survey vessel 4 may tow sensor streamers 12. The sensor streamers 12 may be towed in a selected pattern in the body of water 6 by the survey vessel 4 or a different vessel. As illustrated, the sensor streamers 12 may be laterally spaced apart behind the survey vessel 4. "Lateral" or "laterally," in the present context, means transverse to the direction of the motion of the survey vessel 4. The sensor streamers 12 may each be formed, for example, by coupling a plurality of streamer segments end-to-end as explained in U.S. Pat. No. 7,142,481, the disclosure of which is incorporated herein by reference. While not illustrated, the sensors streamers 12 may be maintained in the selected pattern by towing equipment, such as paravanes or seismic doors that provide lateral force to spread the sensors streamers 12 to selected lateral positions with respect to the survey vessel 4. The sensor streamers 12 may have a length, for example, in a range of from about 2000 meters to about 12000 meters or longer. In some embodiments, the sensor streamers 12 may have a length of at least about 2000 meters, at least about 6000 meters, or at least about 10000 meters. In some embodiments, the sensor streamers 12 may have a length of about 6000 meters to about 12000 meters. The spread 16 of sensor streamers 12 may have a width, for example, in a range of from about 500 meters to about 3000 meters. In some embodiments, the spread 16 of sensor streamers 12 may have a width in a range of from about 500 meters to about 1500 meters and, alternatively from about 1500 meters to about 3000 meters.

The configurations of the sensors streamers 12 on FIG. 1 is provided to illustrate an embodiment of the present invention and is not intended to limit the present invention. It should be noted that, while the present example, shows ten sensor streamers 12, the invention is applicable to any number of laterally spaced apart streamers 12 towed by survey vessel 4 or any other vessel. For example, in some embodiments, more or less than ten laterally spaced apart sensor streamers 12 may be towed by survey vessel 4.

The sensors streamers 12 may include seismic sensors thereon at spaced apart locations. For simplicity, the seismic sensors are not shown on FIG. 1. The seismic sensors may be any type of seismic sensors known in the art, including hydrophones, particle velocity sensors, particle displacement sensors, particle acceleration sensors, or pressure gradient sensors, for example. By way of example, the seismic sensors may generate response signals, such as electrical or optical signals, in response to detecting seismic energy emitted from the seismic sources 10 after the energy has interacted with the rock formations (not shown) below the water bottom. Signals generated by the seismic sensors may be communicated to the recording system 8.

As illustrated in FIG. 1, the survey vessel 4 may further tow seismic sources 10 that a distributed behind the survey vessel 4 at spaced apart locations. In the illustrated embodiment, the seismic sources 10 are extended along the middle of the spread 16 of the sensor streamers 12. The seismic sources 10 may be any suitable electrically powered source for subsurface seismic surveying that generates seismic energy when actuated in the body of water 6. For example, the seismic sources 10 may be electro-mechanical vibrators, electrical marine vibrators, electromagnetic sources, sources employing piezoelectric material, sources employing magnetostrictive material, or any other suitable electrically powered seismic source. Although conventional seismic sources, such as air guns, may be electrically triggered, they are not considered electrically powered as they utilize air for generation of the seismic energy. In some embodiments, the seismic sources may be operated at the same time by use of orthogonal signals using cross-correlation properties such as pseudo-noise signals. One or more of the seismic sources 10 may be an array of individual seismic sources (e.g., seismic source array 42 shown on FIG. 6). The seismic sources 10 may be distributed at spaced apart locations along a source cable 14. For example, the seismic sources 10 may be distributed on the source cable 14 with a spacing of about 50 meters or more. In some embodiments, the seismic sources 10 may be distributed on the source cable 14 with a spacing of about 50 meters, about 100 meters, about 500 meters, about 1000 meters, about 5000 meters, about 6000 meters, or even more. Although only a single source cable 14 is shown with eight seismic sources 10, this is for illustrative purposes. It should be understood that the survey system 2 may include multiple source cables 14 and more or less than eight energy sources 10 on each source cable 14. Source cable 14 may be in the middle of the spread 16 of the sensor streamers 12, as illustrated, or source cable 14 may be offset laterally from the middle of the spread 16.

The source cable 14 may include electrical conductors (not shown separately) for transferring electrical current from the recording system 8 on the survey vessel 4 to the seismic sources 10. The source cable 14 may also include signal cables or fibers for transmitting signals to and/or from the seismic sources 10 to the recording system 8. The source cable 14 may also include strength members (not shown separately) for transmitting towing force from the survey vessel 4 to the seismic sources 10. The source cable 14 may have a length in a range of from about 200 meters to about 2000 meters or longer, for example. In some embodiments, the source cable 14 may have a length of at least about 1000 meters, at least about 2000 meters, at least about 3000 meters, or at least about 4000 meters. In some embodiments, the source cable 14 may have a length of about 4000 meters to about 20000 meters or longer. In the illustrated embodiment, the source cable 14 may extend along substantially the entire length of the sensor streamers 12. In some embodiments, source cable 14 will be relatively parallel to the surface of the body of water 6, while in other embodiments, source cable 14 will utilize depth control mechanisms to locate the energy sources 10 at a plurality of different depths.

Figure 2:
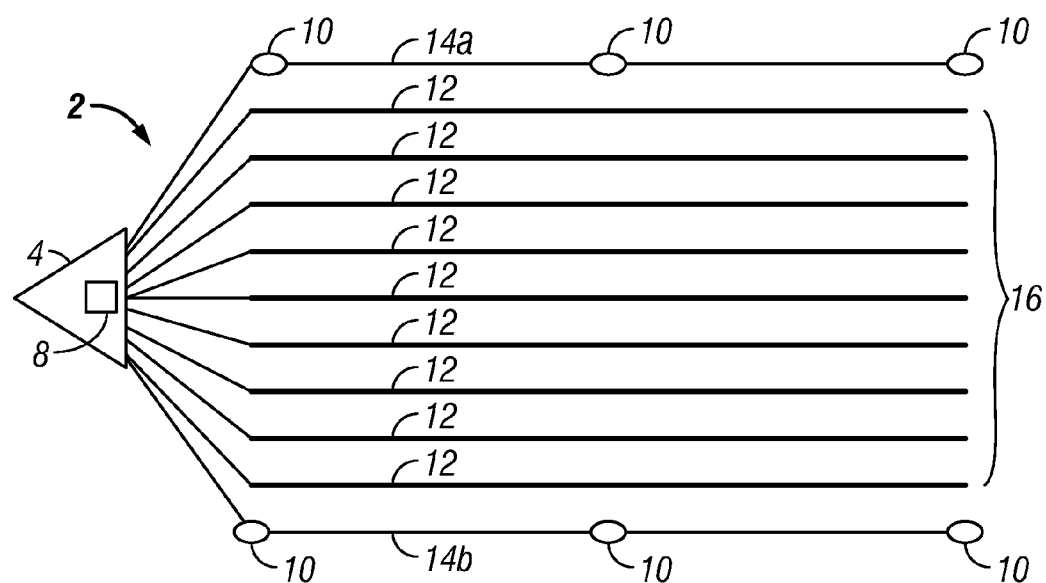
FIG. 2 illustrates another example of a marine seismic survey using electrically powered seismic sources that are distributed at spaced apart locations.

FIG. 2 illustrates an alternative embodiment of the marine seismic survey system 2 in which source cables 14a, 14b are positioned on the outside of the spread 16 of the sensor streamers 12. As illustrated, the system 2 may include a survey vessel 4 that moves along the surface of a body of water 6, wherein the survey vessel 4 includes recording system 8. The system 2 may further include laterally spaced apart sensor streamers 12 on which seismic sensors (not shown) may be disposed at spaced apart locations. The system 2 may further tow source cables 14a, 14b on the outside of the spread 16 of the sensor streamers 12. Seismic sources 10 may be distributed at spaced apart locations on each of the source cables 14a, 14b, the source cable being on either side of the spread 16.

Figure 3:
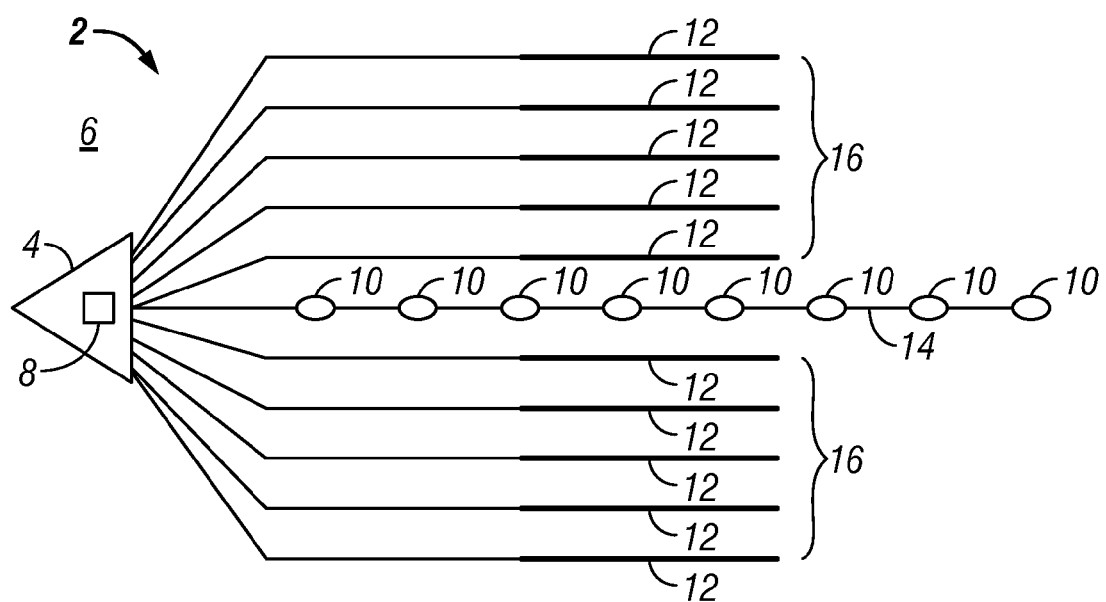
FIG. 3 illustrates yet another example of a marine seismic survey using electrically powered seismic sources that are distributed at spaced apart locations.

FIG. 3 illustrates yet another alternative embodiment of the marine seismic survey system 2 in which shorter sensor streamers 12 are used. As illustrated, the system 2 may include a survey vessel 4 that moves along the surface of a body of water 6, wherein the survey vessel 4 includes recording system 8. The system 2 may further include laterally spaced apart sensor streamers 12 on which seismic sensors (not shown) may be disposed at spaced apart locations. As illustrated, the system 2 may further tow a source cable 14 having seismic sources 10 distributed thereon at spaced apart locations.

While the sensor streamers 12 shown on FIG. 3 may be shorter than the source cable 14, a wider spread 16 of the sensors streamers 12 may be used. For example, the spread 16 may have a width of at least about 1500 meters. In some embodiments, the spread 16 may have a width of about 1500 meters to about 3000 meters. In the illustrated embodiment, the seismic sources 10 may be distributed beyond the proximate and distal ends of the sensor streamers 12 (with respect to the direction of movement of the survey vessel 4). By extending the seismic sources 10, shorter sensor streamers 12 may be used while still obtaining the desired source-streamer offset. As illustrated, the seismic sources 10 may be distributed a distance of at least 500 meters and up to about 6000 meters beyond the proximate and distal ends. In some embodiments, the seismic sources 10 may be distributed over a distance that is from about 2 times to about 4 times the length of each sensor streamers 12. For example, the seismic sources 10 may be distributed over a distances that is about 3 times the length of each sensor streamers 12. In one particular embodiment, the sensor streamers 12 may each have a length of about 6000 meters while the seismic sources 10 are distributed over a distances of about 18000 meters with the seismic sources 10 extending a distance of about 6000 meters between the proximate and distal ends of the sensor streamers 12.

By distributing the seismic sources 10 at spaced apart locations as shown in FIGS. 1-3, a multi-azimuth seismic survey may be conducted in accordance with embodiments of the present invention. More particularly, the seismic sources 10 may be able to better illuminate the target subsurface rock by shooting their respective seismic energies downward from different directions. In this manner, the overall target illumination may be more uniform and more complete. In contrast, due to limitations with air guns and their corresponding sources cables that are conventionally used in seismic surveys, multi-azimuth surveys typically require multiple vessels so that the seismic sources can be arranged to have different shooting directions. Accordingly, present embodiments may enable multi-azimuth seismic surveys using a single survey vessel while conventional seismic surveys utilize two or more vessel to achieve the necessary spacing of seismic sources need for multi-azimuth surveying.

Figure 4:
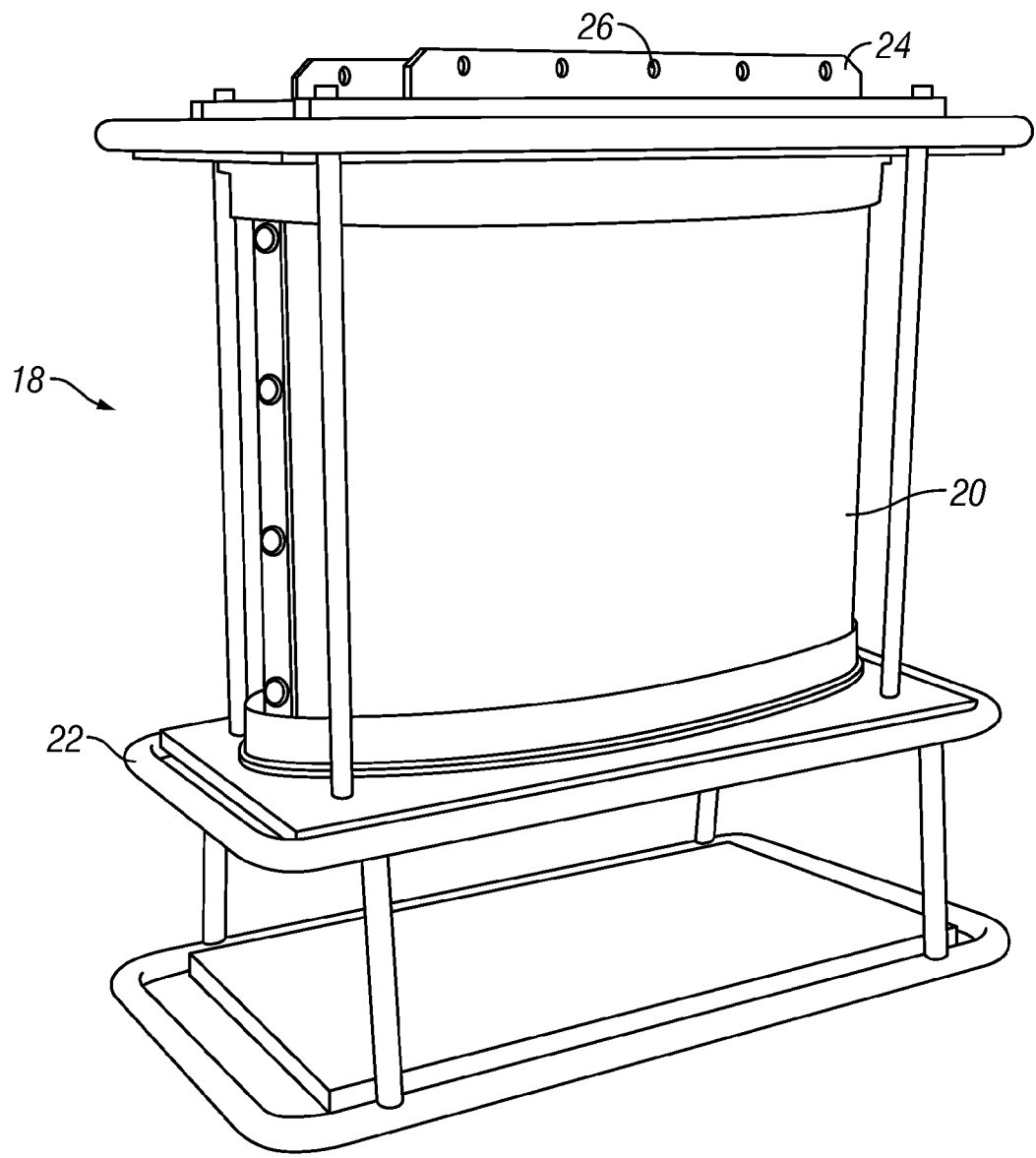
FIG. 4 illustrates an example of an electrically powered marine vibrator.

As described previously, the seismic sources 10 shown on FIGS. 1-3 may include any suitable electrically powered source for subsurface seismic surveying that generates seismic energy when actuated in the body of water 6. FIG. 4 illustrates an embodiment of an electrical marine vibrator, e.g., a flextensional shell-type source 18, that may be implemented into the systems of FIGS. 1-3. As illustrated, the shell-type source 18 may include a flextensional shell 20 mounted within a frame 22. A bracket 24 may be coupled to the top of the frame 22 and may include apertures 26 which may be used for deploying the shell-type source 18 into the water. As the flextensional shell 20 may have an elliptical shape, drag may be reduced as the shell-type source 18 is towed through the body of water 6. For example, one flextensional shell-type source is explained in U.S. Pat. No. 7,881, 158, the disclosure of which is incorporated herein by reference. It should be noted that the shell-type source shown on FIG. 4 is merely illustrative and is not intended to limit the present invention. Other suitable configurations of electrical marine vibrators may be used in accordance with embodiments of the present invention.

Figure 5:
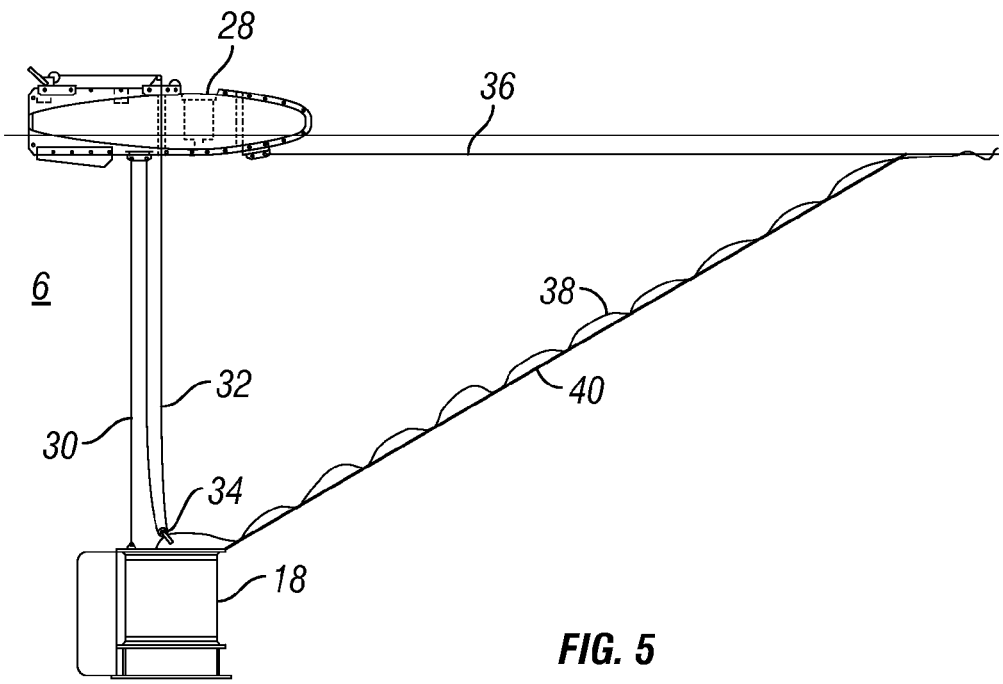
FIG. 5 illustrates an example implementation an electrically powered marine vibrator as towed through the water.

Referring now to FIG. 5, a towing arrangement for a flextensional shell-type source 18 is shown in more detail in accordance with embodiments of the present invention. The shell-type source 18 may be coupled to flotation device 28 by one or more suspension lines, such as holding wire 30 and lifting wire 32. The holding wire 30 may be selected so that the shell-type source 18 may be operated at a selected depth in the body of water 6. In some embodiments, the depth may be about 1 meter to about 150 meters and alternatively from about 1 meter to about 50 meters. In alternative embodiments, the depth may be at least about 1 meter, at least about 15 meters, at least about 150 meters or deeper. Lifting wire 32 may be used to lift the shell-type source 18 as needed to adjust its depth in the body of water 6 or for retrieval or deployment. As illustrated, there may be pulley 34 on the shell-type source 18 to facilitate this adjust with lifting wire 32. Flotation device 28 may be used to suspend the shell-type source 18 in the body of water 6. As illustrated, a tow rope 36 or other suitable line may be coupled to the flotation device 28, for example, to transmit towing force from the survey vessel 4 (e.g., shown on FIGS. 1-3). A cable 40 may extend from the tow rope 36 to the shell-type source 18 to assist in positioning in the body of water 6. A separate signal line 38 may also be used to transmit signals and/or power to the shell-type source 18, for example. It should be noted that the towing configuration shown on FIG. 5 is merely illustrative and is not intended to limit the present invention. Other suitable towing configurations may be used in accordance with embodiments of the present invention.

Figure 6:
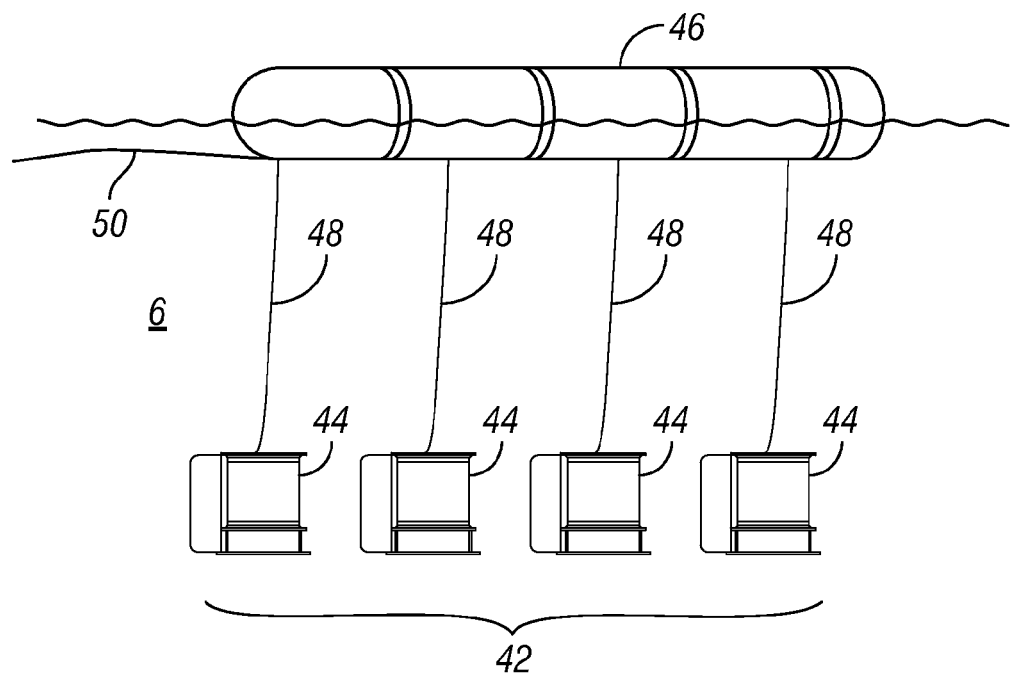
FIG. 6 illustrates an example implementation of an array of electrically powered marine vibrators as towed through the water.
Figure 7:
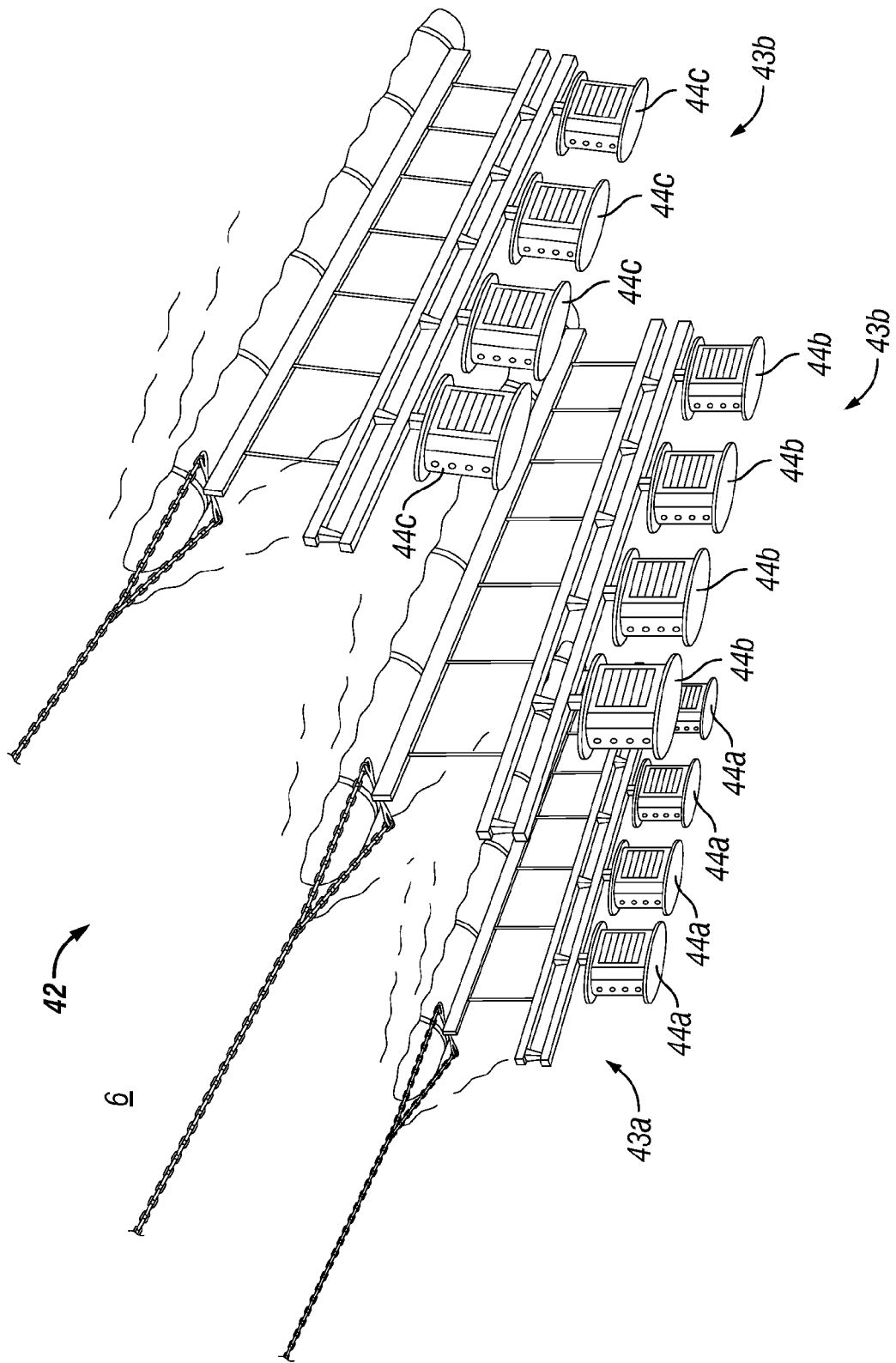
FIG. 7 illustrates another example implementation of an array of electrically powered marine vibrators as towed through the water.

As previously mentioned, the seismic sources 10 shown on FIGS. 1-3 may include an array of individual seismic sources. FIG. 6 illustrates a seismic source array 42 in accordance with embodiments of the present invention. The seismic source array 42 can be incorporated, for example, into the marine seismic survey systems 2 shown on FIGS. 1-3. As illustrated, the seismic source array 42, includes a plurality of individual seismic sources 44. In some embodiments, the individual seismic sources 44 may operate at different frequency bands and different depths depending on the frequency band. For example, one or more of the individual seismic sources 44 may operate at different depths from the other of the sources 44. Each of the individual seismic sources 44 may be coupled to flotation device 46 by one or more suspension lines 48. The suspension lines 48 may be selected so that the individual seismic sources 44 may be operated at a selected depth in the body of water 6. In some embodiments, the depth may be about 1 meter to about 3 meters. In alternative embodiments, the depth may be at least about 1 meter, at least about 3 meters, at least about 9 meters or deeper. Signal and/or power lines (not shown separately) may also be used to transmit power and/or signals to the individual seismic sources 44 from the survey vessel 4 (e.g., shown on FIGS. 1-3). Flotation device 46 may be used to suspend the individual seismic sources 44 in the body of water 6. As illustrated, a tow rope 50 or other suitable line may be coupled to the flotation device 46, for example, to transmit towing force from the survey vessel 4 (e.g., shown on FIGS. 1-3). It should be noted that the configuration of the seismic source array 42 shown on FIG. 6 is merely illustrative and is not intended to limit the present invention. Other suitable configurations of the seismic source array 42 may be used in accordance with embodiments of the present invention. For example, FIG. 7 illustrates a seismic source array 42 comprising three sets 43a, 43b, 43c of individual seismic sources 44a, 44b, 44c, wherein the sets 43a, 43b, 43c are each held at a different depth in the body of water 6.

Figure 8:
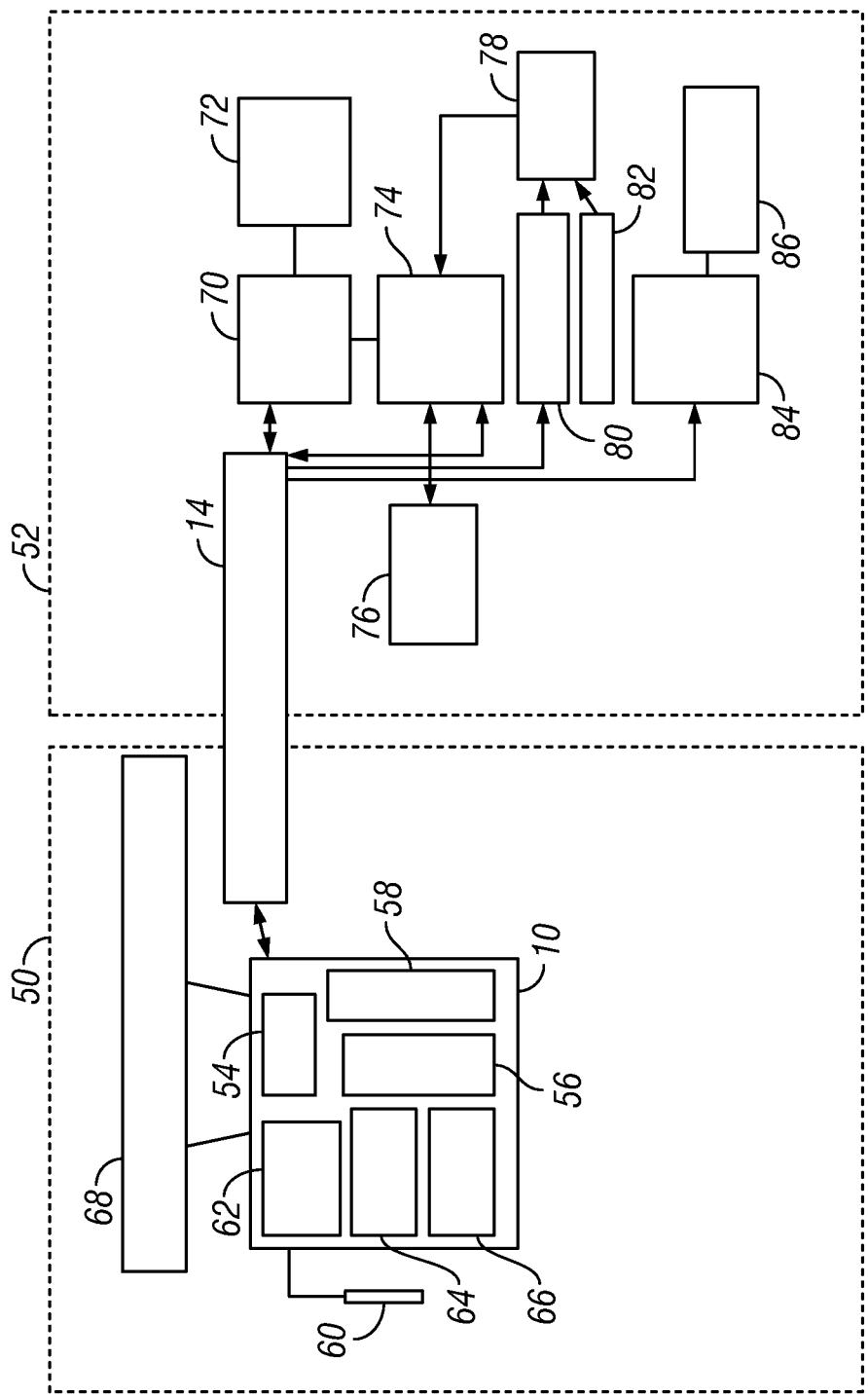
FIG. 8 illustrates an example implementation of an electrically powered seismic source coupled to a survey vessel.

An example implementation for controlling one or more electrically powered seismic sources 10 is shown on FIG. 8. As illustrated, an in-water system 50 and an onboard system 52 may be used in control of the seismic source 10. The onboard system 52 may be part of the recording system 8 shown on FIGS. 1-3, for example. The onboard system 52 and the in-water system 50 may be coupled by a source cable 14. The source cable 14 may include electrical conductors (not shown separately) for transferring electrical current from the onboard system 52 to the in-water system 50. The source cable 14 may also include signal cables or fibers for transmitting signals to and/or from the in-water system 50 to the onboard system 52.

As illustrated, the in-water system 50 may include the one or more seismic sources 10. A seismic source 10 may include a controller 54, which may be, for example, a microprocessor-based controller, programmable logic controller, or similar device. The controller 54 may be coupled to the source cable 14 for receiving and/or transmitting signals to and/or from the onboard system 52. The controller 54 may receive, for example, near-field hydrophone signals, temperature, internal pressure, and external pressure, among others, which then may be sent to the onboard system 52 for quality control. From the onboard system, the controller 54 may receive the source sequence, for example. The seismic source 10 may also include an electrical driver 56, which may be used to generate the seismic energy. The electrical driver 56 may be coupled to a power modulator 58. The power modulator 58 may receive direct current power from the onboard system 52. Because the onboard system 52 transmits direct current power which is then converted in the seismic source 10 to modulated current power, there may be less power losses associated with the transmission of power over the long source cable 14 that may be needed. This may be of added advantage if electromagnetic sensors are deployed in conjunction with in-water system 50. The power modulator 58 may output modulated current power to the electrical driver 56. The in-water system 50 may also include a near-field sensor 60, which may be a conventional seismic sensor, such as hydrophones, particle velocity sensors, particle displacement sensors, particle acceleration sensors, or pressure gradient sensors, for example. The near-field sensor 60 may be positioned to detect the source signature of the adjacent seismic source 10. In some embodiments, the source signature may be combined with the source signatures detected by the other near-field sensors 60 in a seismic source array (e.g., seismic source array 42 shown on FIG. 6). Sensor electronics 62 for the near-filed sensor 60 may be disposed on the adjacent seismic source 10. Sensor electronics 62 may include, for example, an accelerometer, temperature sensors, and the like. The seismic source 10 may also include additional electronics, such as pressure sensors 64 for pressure compensation and temperature sensors 66 for a cooling system. A handling system 68 may be coupled to the seismic source 10, which may include a floats and a system for varying depth of the seismic source 10, such as pulleys, ropes, cables, and/or the like.

As illustrated, the onboard system 52 may be coupled to the in-water system 50 by way of the source cable 14. The onboard system 52 may include a power supply 70. The power supply 70 may supply the in-water system 50, for example, with direct current power. In some embodiment, the power supply 70 for the onboard system 52 may be coupled to the vessel's power system 72. The onboard system 52 may also include a control system 74. The control system 74 may generate and send the control signals such as the source sequence to the in-water system 50 for actuation of the seismic source 10. The control system 74 may include, for example, any microprocessor-based controller, programmable logic controller, or similar device. The control system 74 may be coupled to a user interface 76 for the seismic source 10, which may include a monitor, keyboard, or other equipment, to allow a user to receive and input data. The control system 74 may also receive input from a navigation system 78. From the navigation system 78, the control system 74 may receive an indication of when to start the source sequence based on vessel position, for example. The navigation system 78 may generate the start indication based on position data 80. The position data 80 may include current position of the seismic source 10 based on data from a global position system, acoustic data, or information, that may be received from seismic source 10, for example. The navigation system 78, for example, may also use historical data 82 concerning source locations from previous surveys to steer the sources to a desired position to repeat a survey. The onboard system 52 may also include a recording system 84 for recording the source signal and near-field data. The source signal and near-field data may be used for a number of functions, including quality control. A separate recording system 86 may be used to record data generated by the near-field sensor 60, which may also be used for quality control.

As will be apparent to one of ordinary skill in the art with the benefit of this disclosure, onboard system 52 may be coupled to a plurality of in-water systems 50 to provide for various electric-powered seismic source configurations, such as those illustrated in FIGS. 1-3. Since traditional seismic sources, such as air guns, are typically supplied with air from compressors on the vessel through an umbilical line, air pressure requirements may limit usage of traditional seismic sources in such configurations. In some instances, traditional seismic sources may be used in conjunction with electric powered seismic sources to more fully exploit the various source configurations herein described.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed:

1. A marine seismic survey system comprising:
   a survey vessel;
   a source cable coupled to the survey vessel and having a length of at least about 1000 meters;
   a plurality of seismic sources configured to be towed by the survey vessel, wherein the seismic sources are electrically powered and are distributed behind the survey vessel, wherein the seismic sources are distributed at spaced apart locations on the source cable with a spacing of about 100 meters or more, wherein the seismic sources are selected from the group consisting of electro-mechanical vibrators, electrical marine vibrators, electromagnetic sources, sources employing piezoelectric material, and sources employing magnetostrictive material; and
   a plurality of sensor streamers configured to be towed.

2. The system of claim 1 wherein the plurality of sensor streamers are configured to be towed by the survey vessel.

3. The system of claim 1 wherein at least one of the seismic sources comprises a shell-type source, wherein the shell-type source comprises an elliptically shaped flextensional shell.

4. The system of claim 1 wherein at least one of the seismic sources comprise an array of individual seismic sources.

5. The system of claim 4 wherein at least one of the individual seismic sources operates at a different depth than the other individual seismic sources.

6. The system of claim 1 wherein at least one of the seismic sources operates at a different depth that the other seismic sources.

7. The system of claim 1 wherein the seismic sources are distributed on a source cable coupled to the survey vessel.

8. The system of claim 1 wherein the spacing of the seismic sources is about 500 meters or more.

9. The system of claim 1 wherein the spacing of the seismic sources is about 1000 meters or more.

10. The system of claim 1 wherein the seismic sources are distributed along the middle of a spread of the sensor streamers.

11. The system of claim 1 wherein the system further comprises a second seismic cable on which additional seismic sources are distributed, wherein the second seismic cable is towed by the survey vessel, wherein the second seismic cable and the seismic cable are on either side of a spread of the sensor streamers.

12. The system of claim 1 wherein the seismic sources are distributed a distance of at least 500 meters beyond the proximal and distal ends of the sensor streamers.

13. The system of claim 1 wherein the system further comprises an onboard system comprising a power supply, and wherein each of the seismic sources comprises a power modulator configured to receive direct current power from the power supply and convert the direct current power to modulated current power.

14. A marine seismic survey system comprising:
   a source cable having a length of at least about 1000 meters;
   a plurality of seismic sources, wherein the seismic sources are electrically powered and are distributed at spaced apart locations on the source cable with a spacing of about 100 meters or more, wherein the seismic sources are selected from the group consisting of electro-mechanical vibrators, electrical marine vibrators, electromagnetic sources, sources employing piezoelectric material, and sources employing magnetostrictive material; and
   a spread of sensor streamers, wherein the source cable extends along the middle of the spread of the sensor streamers.

15. The system of claim 14 wherein at least one of the seismic sources comprises a shell-type source, wherein the shell-type source comprises an elliptically shaped flextensional shell.

16. The system of claim 14 wherein the spacing of the seismic sources is about 1000 meters or more.

17. The system of claim 14 wherein the seismic sources are distributed beyond the proximate and distal ends of the sensors streamers.

18. The system of claim 17 wherein the seismic sources are distributed over a distance that is about 2 times to about 4 times the length of each of the sensor streamers.

19. A method of marine seismic surveying comprising:
   towing a source cable having a length of at least about 1000 meters from a survey vessel;
   towing a plurality of electrically powered seismic sources from the survey vessel, wherein the seismic sources are distributed at spaced apart locations on the source cable with a spacing of about 100 meters or more, wherein the seismic sources are selected from the group consisting of electro-mechanical vibrators, electrical marine vibrators, electromagnetic sources, sources employing piezoelectric material, and sources employing magnetostrictive material;
   actuating the seismic sources;
   towing a plurality of sensor streamers; and
   detecting seismic energy generated by the seismic sources.

20. The method of claim 19 wherein the plurality of sensor streamers are towed by the survey vessel.

21. The method of claim 19 wherein at least one of the seismic sources is towed at a different depth than the other seismic sources.

22. The method of claim 19 wherein additional seismic sources are distributed on a second source cable towed by the survey vessel.

23. The method of claim 19 wherein at least one of the electrically powered seismic sources comprises a shell-type source, wherein the shell-type source comprises an elliptically shaped flextensional shell.

24. The method of claim 19 wherein the seismic sources are towed along the middle of a spread of the sensor streamers.

25. The method of claim 19 further comprising additional seismic sources, wherein the additional seismic sources are towed on an opposite side of a spread of the sensor streamers from the seismic sources on the source cable.

26. The method of claim 19 further comprising transmitting direct current power to the seismic sources, wherein the seismic sources convert the direct current power to modulated current power.

* * * * *